United States Patent [19]

Tseng

[11] Patent Number: 6,025,935
[45] Date of Patent: Feb. 15, 2000

[54] CHARGE STORAGE IMAGE SCANNER HAVING EQUALIZING PRE-CHARGE AND RESET IMPROVEMENTS

[75] Inventor: Hsin-Fu Tseng, Los Altos, Calif.

[73] Assignee: Peripheral Imaging Corporation, San Jose, Calif.

[21] Appl. No.: 09/001,875

[22] Filed: Dec. 31, 1997

[51] Int. Cl.[7] .............................. H04N 1/04; H04N 3/14
[52] U.S. Cl. ........................................ 358/483; 348/294
[58] Field of Search ................................... 358/483, 482, 358/474, 475, 505, 509; 348/282, 283, 294, 298, 311, 312, 313, 318, 319, 295, 297, 299; 257/215, 229, 231, 232; 382/312, 278, 318; 250/208.1, 208.2, 208.3, 214 C

[56] References Cited

U.S. PATENT DOCUMENTS 5,650,864   7/1997   Tseng et al. ............................. 358/475
5,724,094   3/1998   Tseng et al. ............................. 348/243
5,898,168   4/1999   Gowda et al. ......................... 250/208.1
5,900,625   5/1999   Baumgartner ........................ 250/214 C
5,917,960   6/1999   Sugawa .................................. 382/278
5,920,274   7/1999   Gowda et al. ........................... 341/155

*Primary Examiner*—Madeleine Nguyen
*Attorney, Agent, or Firm*—The Kline Law Firm

[57] ABSTRACT

A Contact Image Sensor (CIS) system utilizing a phototransistor sensing element that consists of a mechanism to pre-charge or inject a "background charge" into the storage node and allow the charge to reset through the same output base-to-emitter junction. This pre-charge and reset process removes the residual image and replenishes the charge lost by the base-to-emitter sub-threshold leakage current. Furthermore, the reset of the injected charge through the same output base-to-emitter junction automatically sets the phototransistor to an initial dark level, which is at the start of a linear region of the response versus illumination curve, and thus substantially improves the photo-response linearity.

8 Claims, 15 Drawing Sheets

CHARGE STORAGE IMAGE SCANNER HAVING EQUALIZING PRE-CHARGE AND RESET IMPROVEMENTS

FIELD OF THE INVENTION

The present invention relates generally to image-sensing arrays that scan documents, and more particularly is a linearly-butted array of contact image sensors using phototransistors as sensing elements for sensitivity enhancement, while at the same time eliminating the problems of photo-response non-linearity, image lag, and low-light-level thresholding (or waterfall) effect.

BACKGROUND OF THE INVENTION

Contact Image Sensor (CIS) was first developed by Mitsubishi in the early 1980's as an alternative document scanning system to the conventional "lens reduction image sensing system" which utilizes a charge coupled device (CCD) or self-scanned photodiode array. The major advantages of the CIS scanning system over the conventional CCD imaging system are its compactness, light weight, low power consumption, and ease of system assembly.

FIG. 1 illustrates a conventional lens reduction image sensing system using a CCD array. An original document 1 is illuminated by a light source 2. Since a CCD image sensor 3 is typically approximately one inch long, an optical lens 4 is required to reduce the image of the text on the document 1 so that a full-width image can be received in the CCD image sensor 3. In addition, to obtain the necessary reduction, an optical distance of 10 to 30 cm is required between the CCD image sensor 3 and the document 1. This optical separation distance necessitates a rather bulky assembly for the overall scanning device, and for this reason, some prior art devices use sophisticated (hence expensive and difficult to manufacture) folded optical schemes to reduce the total physical size of the assembly.

FIG. 2 depicts a contact image sensor (CIS) system which is an improvement on the system shown in FIG. 1. In this device the optical reduction system is replaced with a full-width rod/lens system 5. This system allows one-to-one scanning of the document because the rod lens 5 and a hybrid image sensor 6 are of the same width as (or greater width than) the document to be scanned. This arrangement reduces the distance required between the image sensor and document being scanned to less than 2 cm.

A cross section of such an improved prior art imaging system utilizing a hybrid image sensor chip 6 is shown in FIG. 3, which depicts the arrangement of the components within a housing with a cover glass 7 to receive documents. FIG. 4 is a block diagram of such an imaging system, with FIG. 5 showing details of the construction of a prior art hybrid image sensor array 6. In this hybrid package, a plurality of individual sensor chips 61 are butted end-to-end on a single substrate. The number of individual sensor chips chosen is dependent upon the desired width of scanning. The hybrid sensor array 6 also contains signal-processing means to serially activate the individual sensor chips and to process the output signals.

A block diagram illustrating the function of a typical prior art individual sensor chip 61 is shown in FIG. 6, with details of the sensor elements shown in FIG. 7. The structure and function of this sensor chip is described in U.S. Pat. No. 5,299,013, issued on Mar. 29, 1994. With reference to FIGS. 5–7, the individual sensor chip 61 comprises an array of photodetectors, an array of multiplexing switches, a digital scanning shift register, built-in buffers, and a chip enable (chip selector). In operation, the hybrid sensor chip 6 is triggered by a start pulse to the first-in-sequence individual sensor chip 61 which serially activates the photodetectors on the first individual sensor chip 61. After the signal from the last photodetector element of the first individual sensor chip 61 is read, an end-of-scan (EOS) pulse is generated so that the next sensor chip in sequence is triggered.

The individual sensor chips 61 of most prior art devices utilize npn (or pnp) phototransistors as the sensing elements, as illustrated in the circuit diagram shown in FIG. 7. The npn phototransistors provide some current gain for the detected light signal, and thus serve to increase the photosensitivity of the device. However, phototransistors are subject to several inherent shortcomings. The phototransistor sensing array exhibits rather large photo-response non-linearity, thresholding problems at low light levels (waterfall effect), and substantial problems with image lag or carryover of portions of previous images to new scans (some times called residual image). Because of these problems, contact image sensor arrays using phototransistors as sensing elements are seldom used in scanner applications which require color or wide gray-scale linearity. Charge coupled devices (CCD) have thus generally been utilized in devices that are to be used for reproducing color or wide-range gray-scale images, because they exhibit the required dynamic range, linearity, and negligible image lag needed for these applications.

To understand the problems and causes of the waterfall effect and image-lag, please refer to FIGS. 8 and 9. FIG. 8 shows the CIS pixels and the readout circuit. Each pixel of a CIS consists of a npn phototransistor, its base-to-collector capacitance $C_{pixel}$ and a multiplexing switch connected as shown. In addition, for the entire line of sensors there is one common (shared) Reset switch and an analog output bus with its capacitance $C_{out}$. FIG. 9 shows the timing of the clock input and the outputs of the $n^{th}$ and $(n+1)^{th}$ stages of the scanning digital shift register which drive the multiplexing switches of the $n^{th}$ and $(n+1)^{th}$ pixel. There is one clock cycle for each pixel, during which that pixel's multiplexing switch is closed in sequence from the first to the last pixels along the CIS array. During the first part of each clock cycle, called the sampling phase, the common Reset switch is open, so the selected pixel drives the analog output bus. During the second part of each clock cycle, called the Reset phase, the Reset switch is closed, and the output of the selected pixel is grounded. Every clock cycle during which a given pixel is not selected (its multiplexing switch is open) is referred to as that pixel's Integration phase.

Description of Operation (1) Integration Phase: During a pixel's Integration phase, its multiplexing switch is open. Incident light induces charge carriers into the reverse-biased base-to-collector junction, so a current proportional to the light flows from collector to base. Charge accumulates on the base-to-collector capacitance $C_{pixel}$ increasing base voltage $V_{base}$. At saturation, the base voltage will approach the voltage of the collector.

(2) Sampling Phase: When a pixel is selected for reading, its multiplexing switch is closed. Since the base-to-emitter junction is forward biased, a base current will flow from the base to the emitter. Consequently, a collector current multiplied by the current gain; $h_{fe}$ or Beta, of the phototransistor will flow into the analog output bus capacitance $C_{out}$. The voltage on the bus $V_{out}$ rises and the voltage on the base $V_{base}$ falls slightly, until the voltage difference $V_{be}$ is reduced to the base-emitter junction threshold voltage $V_T$, where the phototransistor turns off. Since this point is reached asymptotically slowly, usually $V_{out}$ is sampled before this time. As long as the sampling is done at a constant time delay after the multiplexing switch is closed, a valid image is obtained.

(3) Reset Phase: After $V_{out}$ has been sampled, the multiplexing switch is kept closed as the Reset switch is closed. This discharges the analog output bus capacitance $C_{out}$ directly, and also the base capacitance $C_{pixel}$ through the base-emitter junction of the phototransistor and through the multiplexing switch, until $V_{base}$ decreases to threshold $V_T$.

Image-Lag Problem

Unlike the reset of $C_{out}$, which is accomplished directly through the reset switch, the reset of $C_{pixel}$ is through the base-emitter junction and the multiplexing switch. This is a very slow process, and since the reset time is short, the result is an incomplete reset of the base capacitance $C_{pixel}$. This is because the base-emitter on-resistance is dependent on the $V_{be}$ voltage. The resistance increases exponentially with decreasing $V_{be}$ and approaches infinity when $V_{be}$ approaches $V_T$. The high on-resistance of the base-emitter junction makes the reset of $C_{pixel}$ asymptotically slow and results in carryover of signal charge into the next several scans.

FIG. 10 shows a plot of image lag or residual signal charge as a result of this incomplete reset of $C_{pixel}$. The plot was obtained by using a 300 dpi CIS module which used the prior art npn phototransistors as detector elements. The module was exposed to a pulse light and then read out for several scans. The first scan represents the true signal while the remaining scans represent the residual image signal or image lag. The plot in FIG. 10 shows the residual image in the second, third, and forth scans in percentage relative to the output signal of the first scan. As can be seen from the plot, a residual image as high as 32%, 15%, and 9% is left behind in the second, third, and forth scans, respectively. This serious image-lag problem not only makes the scanned picture blurry, it also will cause non-linearity of photo-response.

Waterfall Effect

After imaging an extensive black area (no light) of the original document, and moving into a dark gray area, certain pixels continue to report "black" for a significant time, often several lines of scanning. The visual effect is black streaks downward from black areas of the document into dark gray areas below. The streaks resemble a waterfall of black ink, hence the name.

The cause of this waterfall effect is the sub-threshold leakage current of the base-emitter junction of the phototransistor during the reset periods in the dark. For ease of explanation, we have defined the threshold voltage $V_T$ as the voltage which when $V_{be}$ drops to this voltage value, the base-to-emitter forward-bias current cuts off. However in reality, the base-to-emitter forward-bias current never cuts off. Instead, the current will decrease exponentially with decreasing $V_{be}$. For convenience, we say the forward-bias current cuts off when the current drops below a certain value. The small current flow through the base-emitter junction, when $V_{be}$ is below the $V_T$ value, is referred to as the sub-threshold leakage current of the base-emitter junction. During a long "dark" exposure time, this sub-threshold leakage current discharges $C_{pixel}$ so that $V_{base}<V_T$ (in other words, "blacker than black"). This condition is not cleared during the Reset phase, which depends on the assumption that $V_{base}>V_T$ in order to forward bias the base-emitter junction and return $V_{base}$ to $V_T$. In other words, because the reset path is through the base-emitter diode, it can only pull $V_{base}$ down to $V_T$, not up to it. Once $V_{base}<V_T$, the only way $C_{pixel}$ can be recharged enough to forward-bias the base-emitter junction is by photoelectric current. In a white area, the photoelectric current is usually sufficient to restore $V_{base}>V_T$ and return to normal operation within a scan line time. However, if a black area is followed by a dark gray area, the photoelectric current charges $C_{pixel}$ very slowly, and several scan line times are necessary to forward bias the phototransistor again, thus resulting in a waterfall effect. Furthermore, this waterfall effect will also cause photo-response non-linearity in the low-light-level range.

Accordingly, it is an object of the present invention to provide a wide-dynamic-range contact image sensor (CIS) which permits use of phototransistor image sensors without the previous limitations of image lag, low-light-level thresholding or waterfall effect, and photo-response non-linearity.

It is a further object of the present invention to provide a CIS that has a simple device structure and sensitivity enhancement (or current gain) of a phototransistor detector and with performance improvements that can be used for color and gray-scale-sensitive scanning applications.

It is a further object of the present invention to provide a CIS that has a simple device structure and sensitivity enhancement (or current gain) of a phototransistor detector and can be operated with a speed much faster than previous phototransistor CIS arrays.

It is a further object of the present invention to provide a CIS that has smaller die size as compared with CIS with active photodiode detector and at the same time operates with performance that is adequate for both color and gray-scale-sensitive scanning applications.

It is a still further object of the present invention to provide a high-performance CIS that can be manufactured using a CMOS process, which is used in producing very high-volume CIS sensors for facsimile machine applications.

SUMMARY OF THE INVENTION

In summary, the present invention permits construction of a contact image sensor using phototransistors as sensing elements, obtaining the high sensitivity (through transistor current gain), simple device structure, and smaller die size obtainable with a phototransistor sensing array without the usual limitations of image lag, low-light-level thresholding (waterfall effect), and photo-response non-linearity. The present invention is not limiting: it permits use of either npn or pnp phototransistor technology; the present description indicates npn phototransistors for simplicity, but it specifically includes the option of inverting all or any polarities where favorable. The device comprises a plurality of phototransistor sensing elements along with control and drive clocks to control the timing and scan advance of the circuit, buffer amplifiers, and a digital scanning shift register to provide sequential addressing of the sensing elements and their appropriate switching elements. The device further comprises a mechanism to inject a fixed amount of charge (referred to as "background charge" or "fat-zero charge") into the base ($C_{pixel}$) of each phototransistor sensing element after the "Sampling phase" and before the "Reset phase" of the sensing element. The device operates on the theory that the addition of a "background charge" will significantly speed up the Reset process and in the meantime replenish the charge lost through the base-emitter sub-threshold leakage current, and thus eliminate the image-lag and waterfall-effect problems. Furthermore, the reset of the injected charge through the same output base-to-emitter junction automatically sets the phototransistor to an initial dark level, which is at the start of a linear region of the response versus illumination curve, and thus substantially improves the photo-response linearity. If the amount of background charge injected into the base ($C_{pixel}$) is large enough, the residual charge at the base after reset will be fixed and independent of the initial signal charge. This, in effect, eliminates the image-lag problem. Furthermore, since we do not have to reset the charge completely as long as the residual charge is fixed for different initial signal charges, this in turn speeds up the "apparent" reset process. The function of the "background charge" to speed up the Reset process is very similar to the background charge (or circulating charge) of a Bucket-Brigade Charge Transfer Device (BBD) in improving its speed and charge transfer efficiency, as described in the paper by C. N. Berglund and Harry J. Boll entitled "Performance Limitations of the IGFET Bucket-Brigade Shift Register." IEEE Transaction on Electron Devices, Vol. ED-19, No. 7, July 1972, pages 852–860. A similar analogue applies to the "fat-zero charge" in improving the speed and charge transfer efficiency of a surface-channel Charge Coupled Device (CCD). In a preferred embodiment, the sensing elements are grouped in pairs, one of each pair outputting to an odd video line, the other outputting to an even video line, with the outputs eventually multiplexed together. Furthermore, the phototransistor is reset during the time the next phototransistor in sequence is being addressed. Such an arrangement enhances the timing requirements of the "Sampling" and the "Resetting" of the individual transistors, and effectively quadruples the time available for the "Reset phase".

An advantage of the present invention is that the speed-up of the Reset process by the addition of background charge eliminates the image-lag problem.

Another advantage of the present invention is that replenishing the charge lost through the base-emitter junction sub-threshold leakage current by the background charge eliminates the low-light-level thresholding or waterfall-effect problem.

Another advantage of the present invention is that the reset of the "background charge" through the same output base-to-emitter junction automatically sets the phototransistor to an initial dark level, which is at the start of a linear region of the response versus illumination curve, and thus substantially improves the photo-response linearity.

Another advantage of the present invention is that the speed-up of the Reset process by the background charge and the quadruple of the Reset time significantly improve the operating speed of the CIS array.

Another advantage of the present invention is that the performance of the CIS array is significantly improved without changing the phototransistor manufacturing process and therefore allows the use of the high-volume manufacturing process of a facsimile-machine CIS array.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 11A:
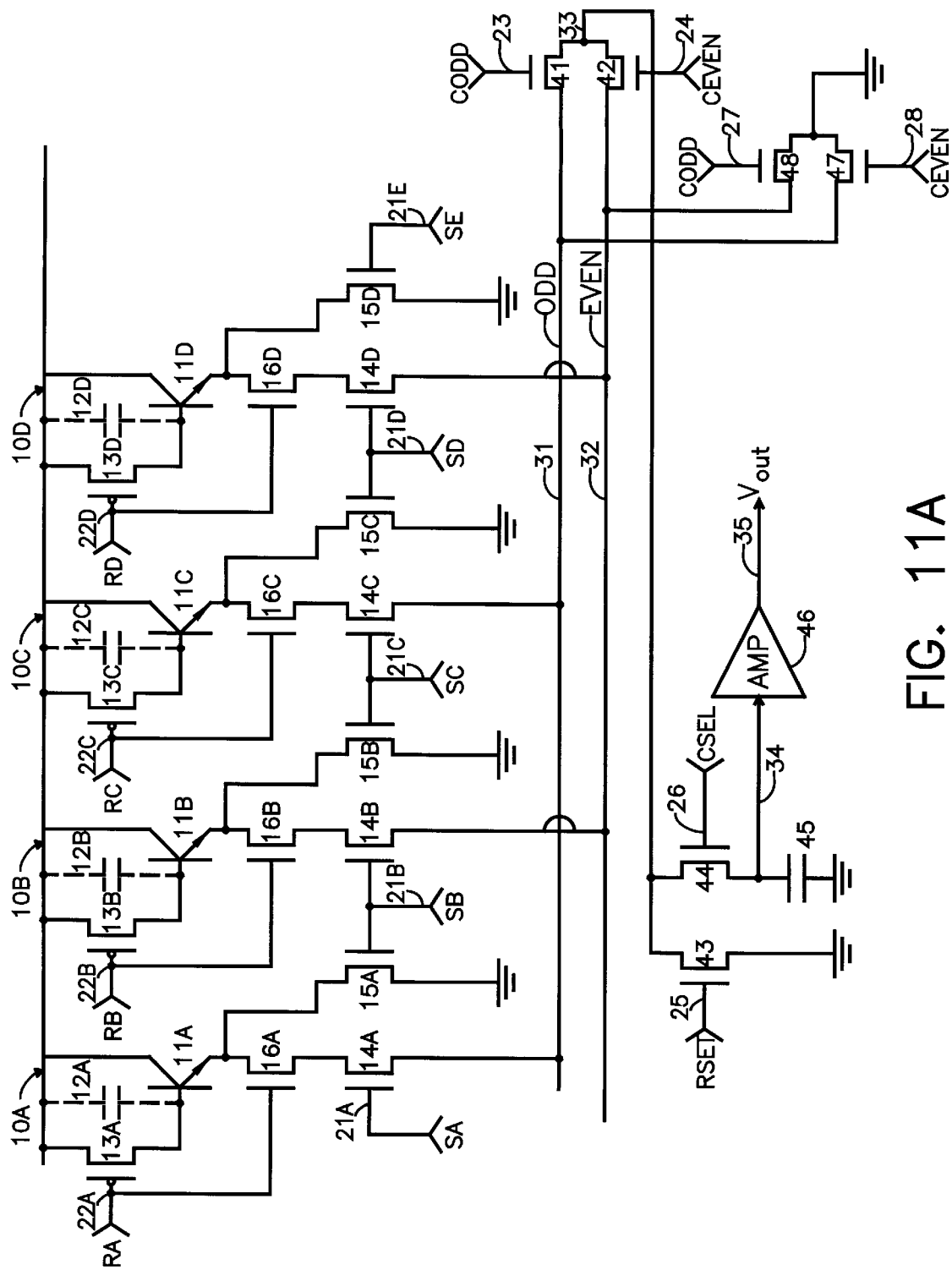
FIG. 11A shows the CIS pixels and the readout circuitry of the present invention.
Figure 11B:
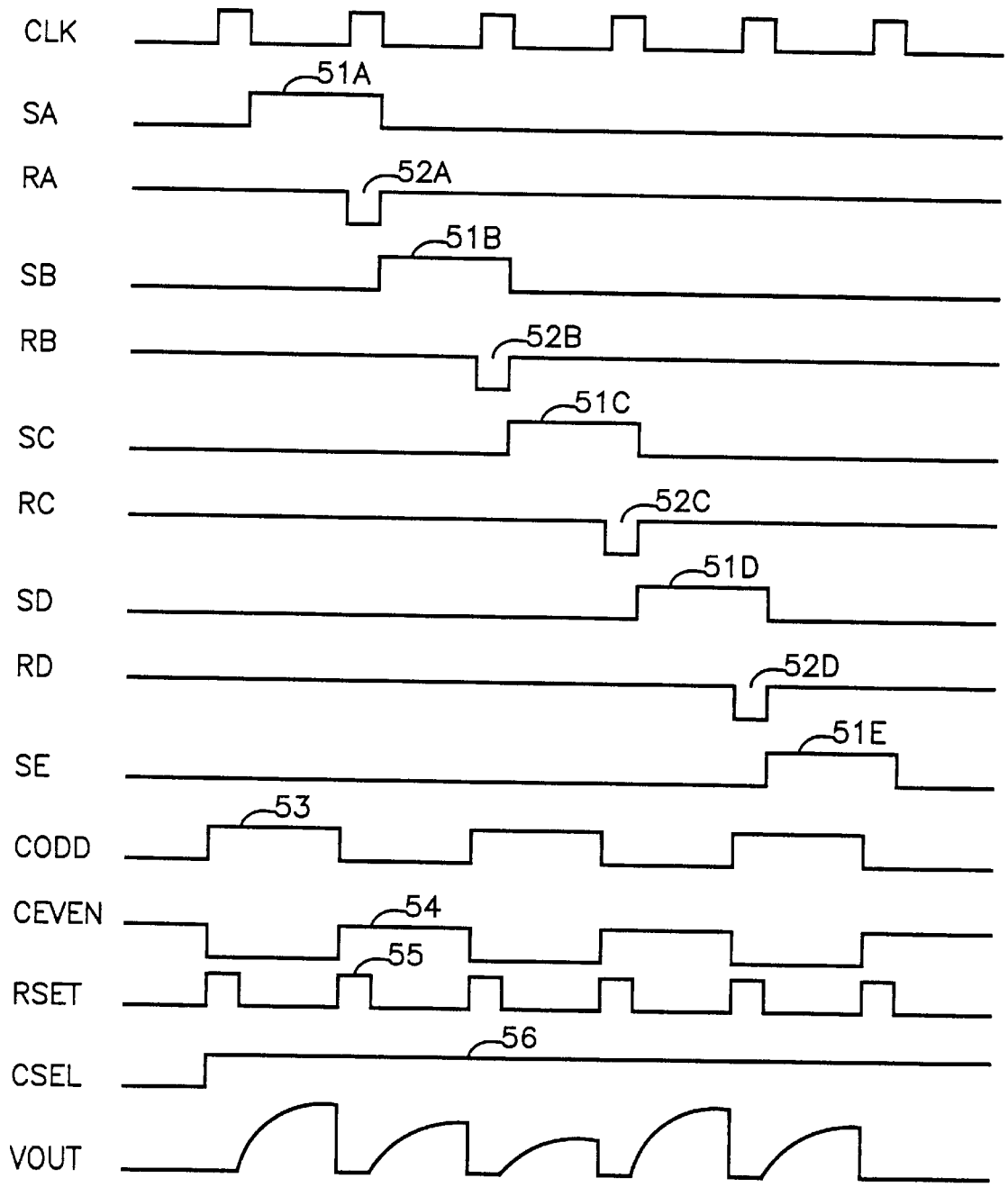
FIG. 11B shows the clock, the scanning digital shift register outputs, and other timing pulses to operate the CIS array of the present invention in FIG. 11A.

FIGS. 11A and 11B show the preferred embodiment of the present invention which includes a mechanism to pre-charge the storage node of the phototransistor detector element or to inject a fixed amount of charge into the storage node before the "Reset process". The preferred embodiment further comprises an odd-even output structure to increase the reset time for the phototransistor storage node through the base-to-emitter junction of the phototransistor. The addition of the "background charge" by the pre-charge or injection process substantially reduces the image-lag and waterfall-effect problems and improves the photo-response linearity. The odd-even output structure of the preferred embodiment further improves the operating speed of the sensor array. The new structure is best seen by comparison of FIG. 11A with FIG. 8.

FIG. 11A illustrates an array of four detector elements 10A to 10D, which can be part of a longer array. FIG. 11B shows the timing diagram, which drives the various nodes of the device. The circuit to generate the timing is not shown in the figures. These timings can be easily generated from the input clock and the outputs of the scanning digital shift register by using simple logic circuits. Similar to FIG. 8, each detector element in the array consists of a phototransistor (11A to 11D) as the sensing element. Each sensing element has a storage capacitor (12A to 12D), which are formed by the base-to-collector junction capacitance of the phototransistor. Each detector element also has a readout-multiplexing switch (14A to 14D). In addition to the above-described components, each detector element in the array also consists of a pre-charge switch (13A to 13D) and an isolation switch (16A to 16D), to pre-charge the storage node (12A to 12D) after the "Sampling process" and before the "Reset process". The precharge switches (13A to 13D) are P-channel transistors and are used to connect the phototransistor base to the collector and effectively inject an amount of charge equivalent to a "saturation charge" to the base. The isolation switches 16A to 16D are N-channel transistors and are used to isolate the phototransistor from the output video line during the charge injection period. Each detector element further consists of a reset switch 15A to 15D to reset the charge at the storage node through the base-to-emitter junction.

Figure 1:
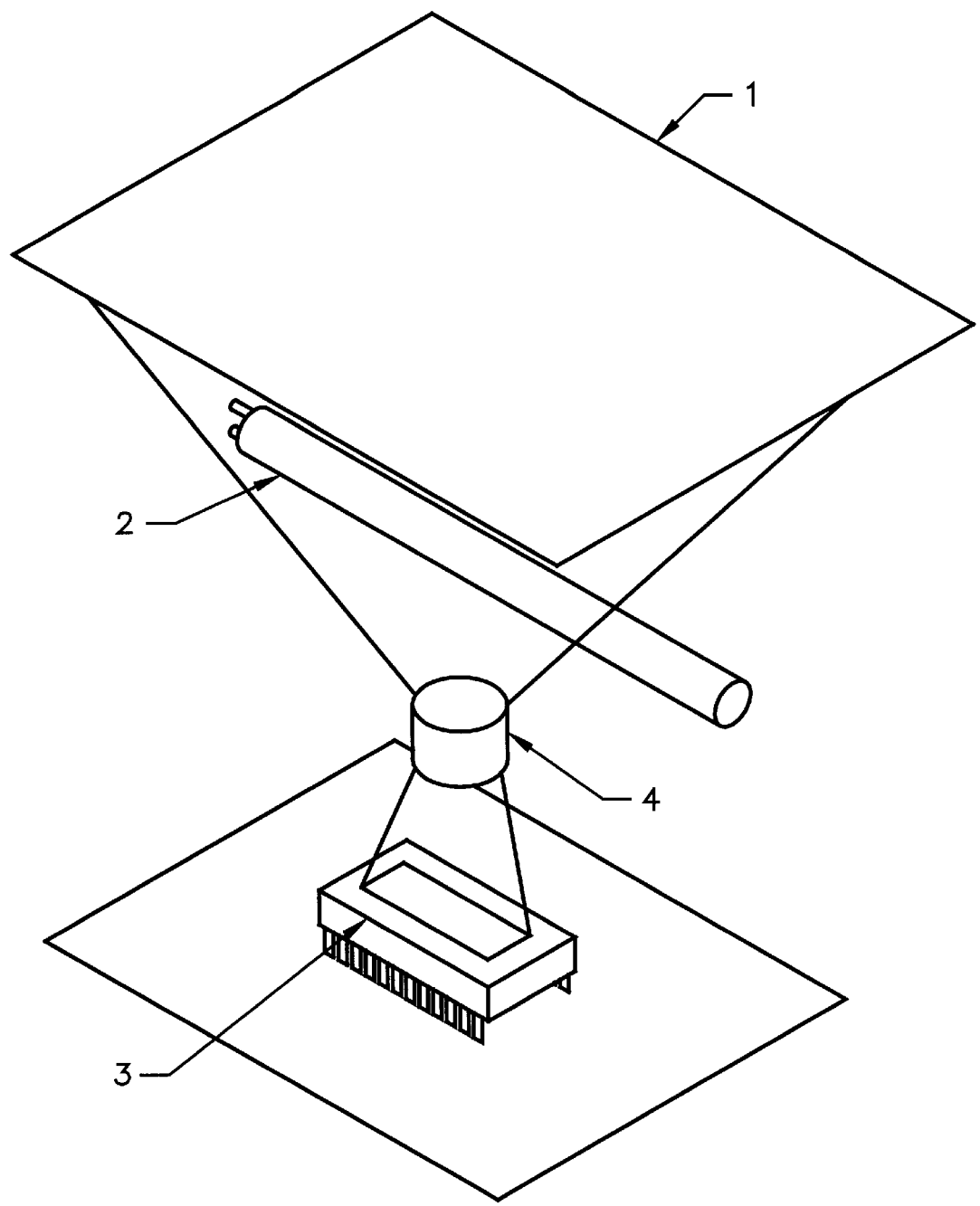
FIG. 1 is a schematic diagram of a prior art CCD scanning device, which uses optical size conversion.
Figure 2:
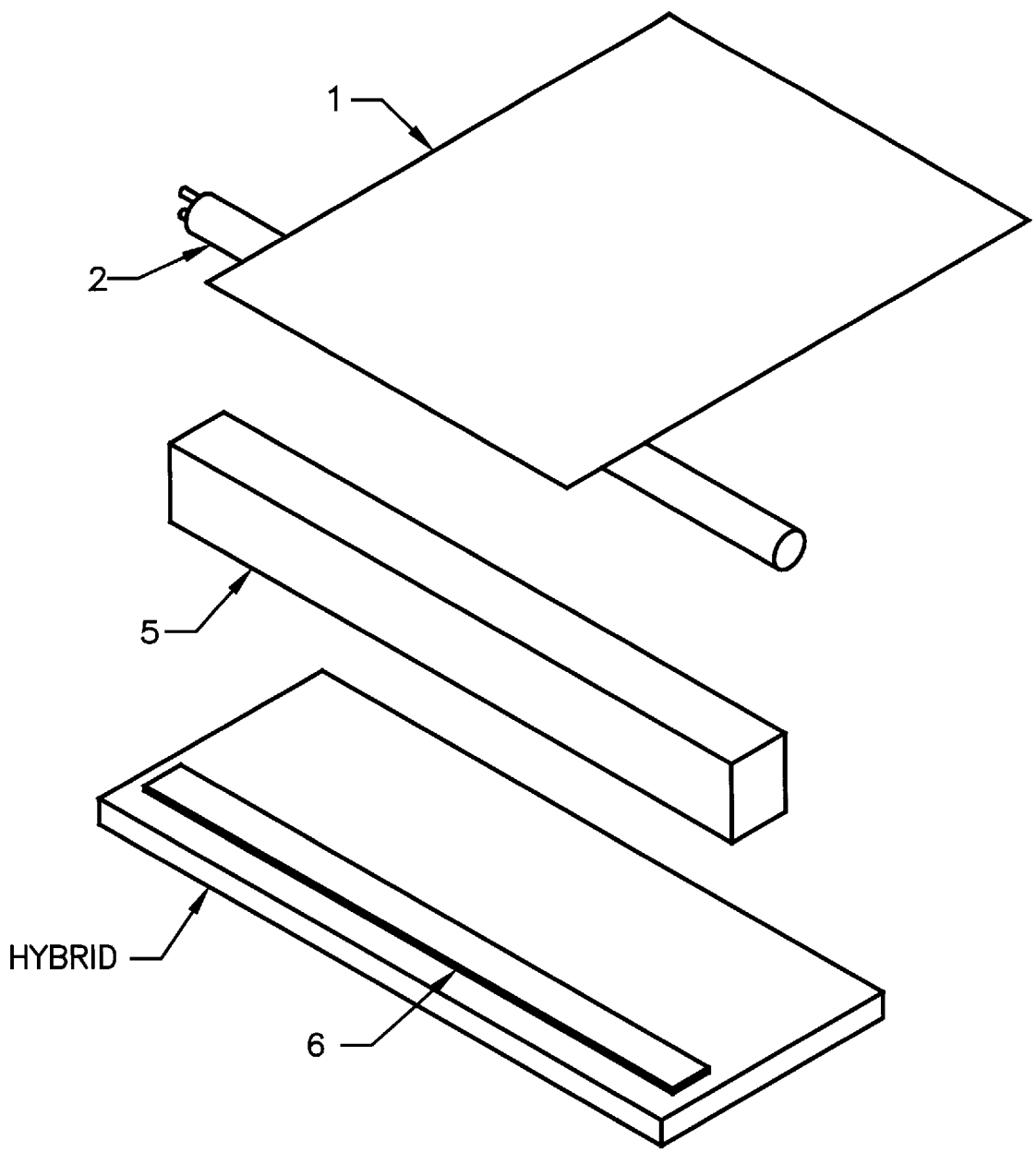
FIG. 2 is a schematic diagram of a more-current prior art full-width scanning device, a contact image sensor (CIS).
Figure 3:
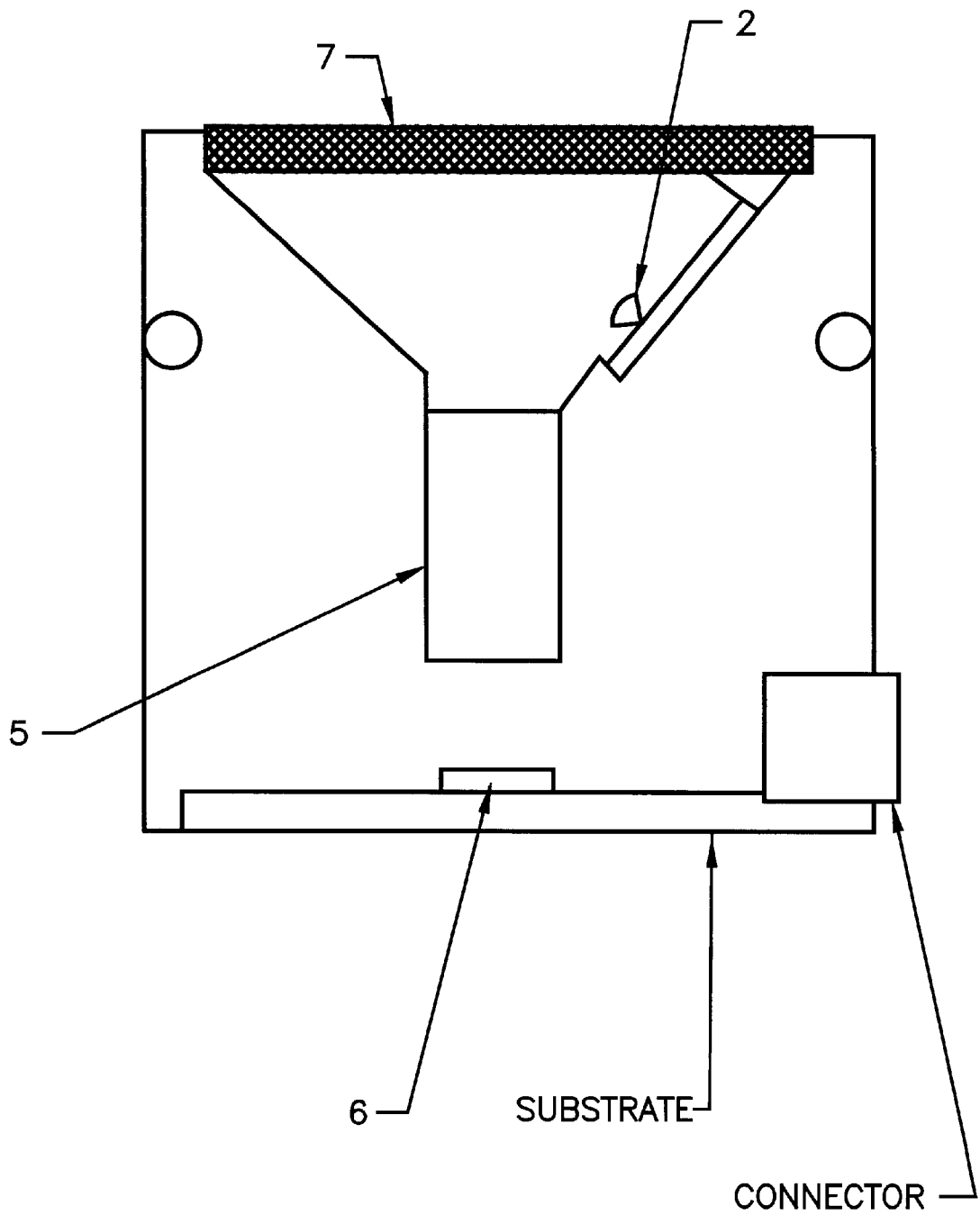
FIG. 3 is a cross section of a more-current prior art CIS scanning device such as that shown in FIG. 2.
Figure 4:
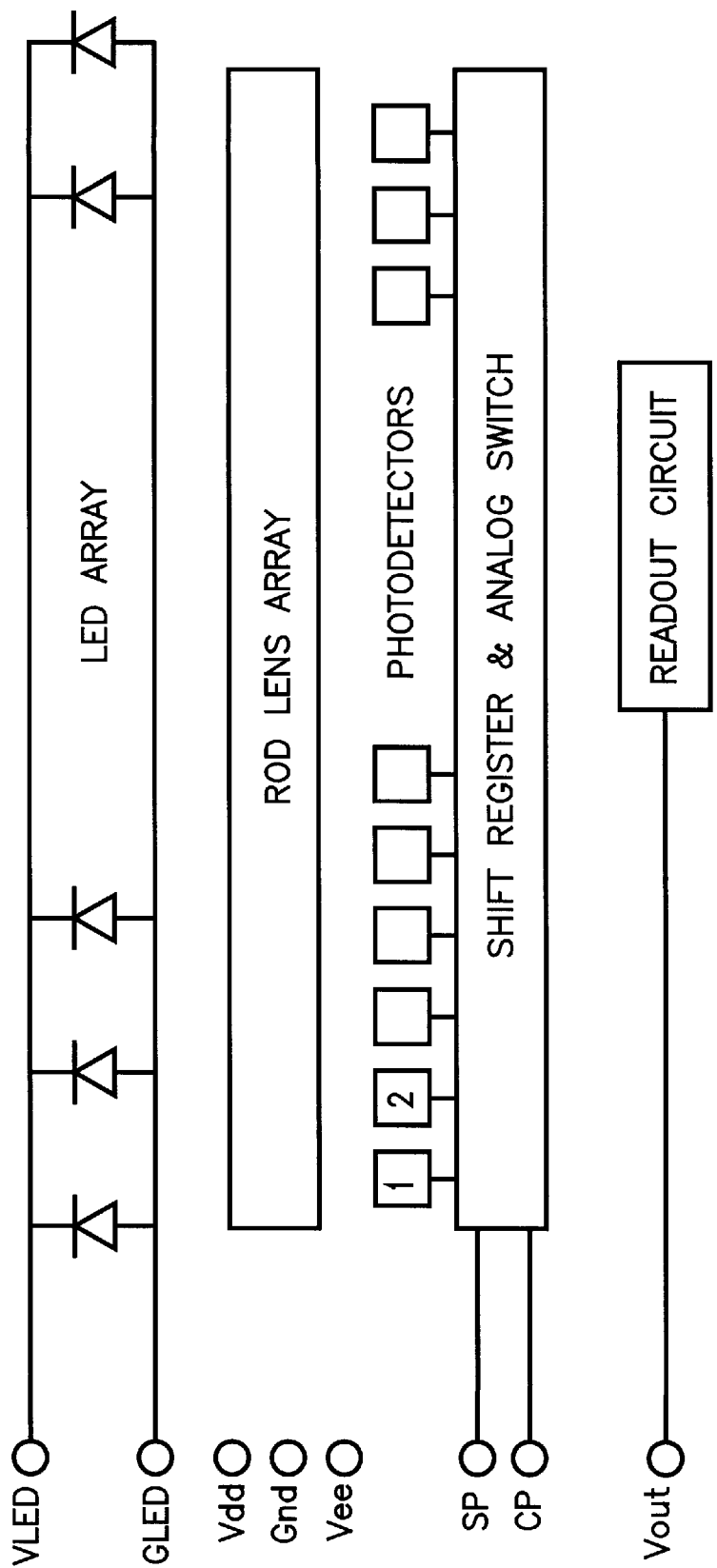
FIG. 4 is a block diagram of a prior art CIS scanning device, such as that shown in FIG. 2.
Figure 5:
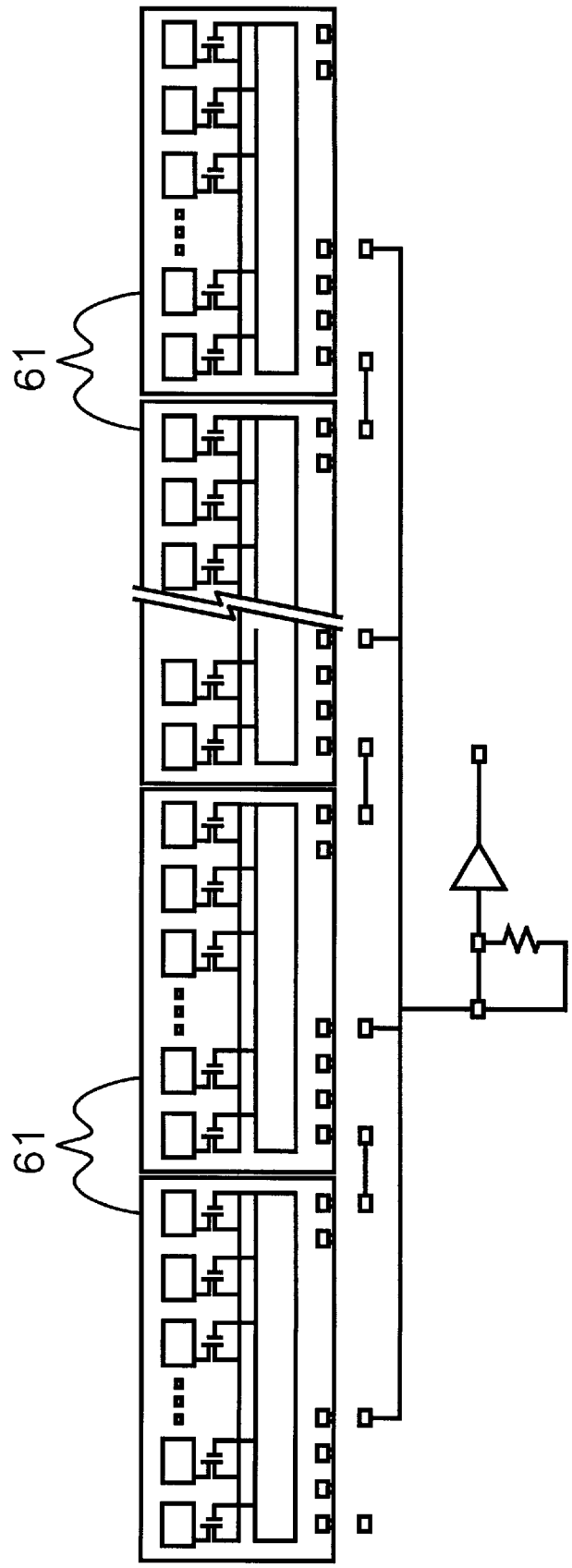
FIG. 5 is a block diagram of the hybrid sensor chip of a prior art CIS scanning device.

The output circuit of the array consists of the ODD video line 31 and the EVEN video lines 32; and the ODD-EVEN multiplexing switches 41 and 42. The outputs of the ODD pixels 10A and 10C are connected to the ODD video line 31 and the outputs of the EVEN pixels 10B and 10D are connected to the EVEN video line 32. The two video-lines are multiplexed into one combined video line 33. The combined video line 33 is fed through a chip-select switch 44 to drive the video line capacitor 45. The amplifier 46 buffers the output node 34 before it is brought out to the outside terminal 35. The select switches 47 and 48 are used to ground the odd and even video lines when they are disconnected from the output video line 33. The output circuit further consists of a reset switch 43 to reset the output video lines after the Sampling process. Please note that the CSEL pulse 56, which drives the gate 26 of the chip select switch 44, stays "high" and turns on the chip select switch 44 during the entire readout time of the sensor chip selected. It turns off the chip select switch 44 after the completion of the readout process of the particular sensor chip selected. As a result, only one sensor chip at a time is connected to the output buffer amplifier 46, which is outside the individual sensor chips and is shared by all the sensor chips on the hybrid sensor board (similar to the arrangement in FIG. 5).

Description of Operation (1) Integration Phase: Similar to the sensing elements in FIG. 8, during a pixel's Integration phase the switches associated with each sensing element, such as 13A to 13D, 14A to 14D, and 15A to 15D, are open. As a result, the storage capacitors 12A to 12D are isolated. Incident light induces charge carriers into the reverse-biased base-to-collector junction capacitors 12A to 12D, so that a current proportional to the light flows from collector to base. Charge accumulates on the base-to-collector capacitors 12A to 12D forcing the base potential to rise. At saturation, the base voltage will approach the potential of the collector.

Figure 6:
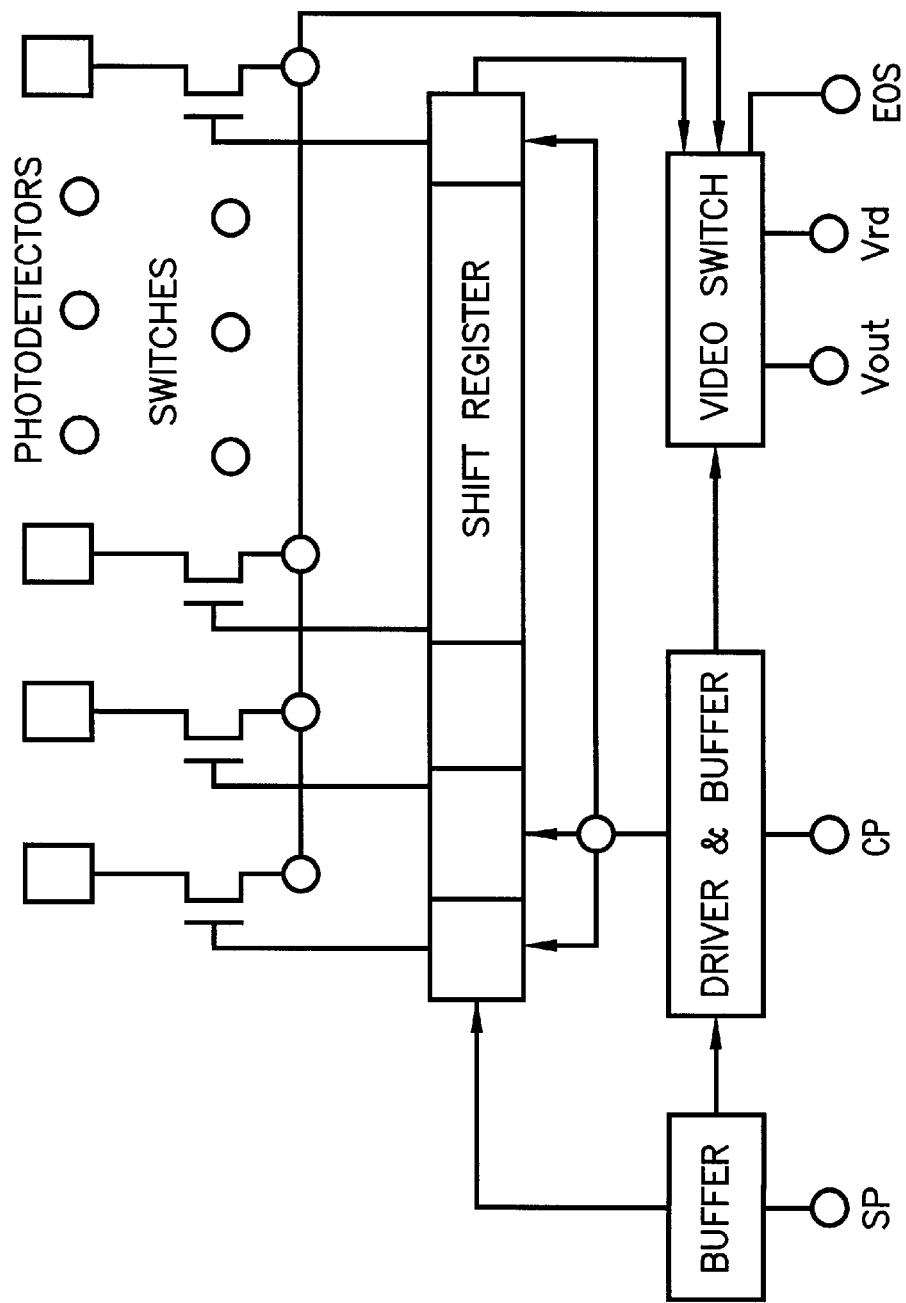
FIG. 6 is a block diagram showing the arrangements of a single chip of the hybrid sensor array.
Figure 7:
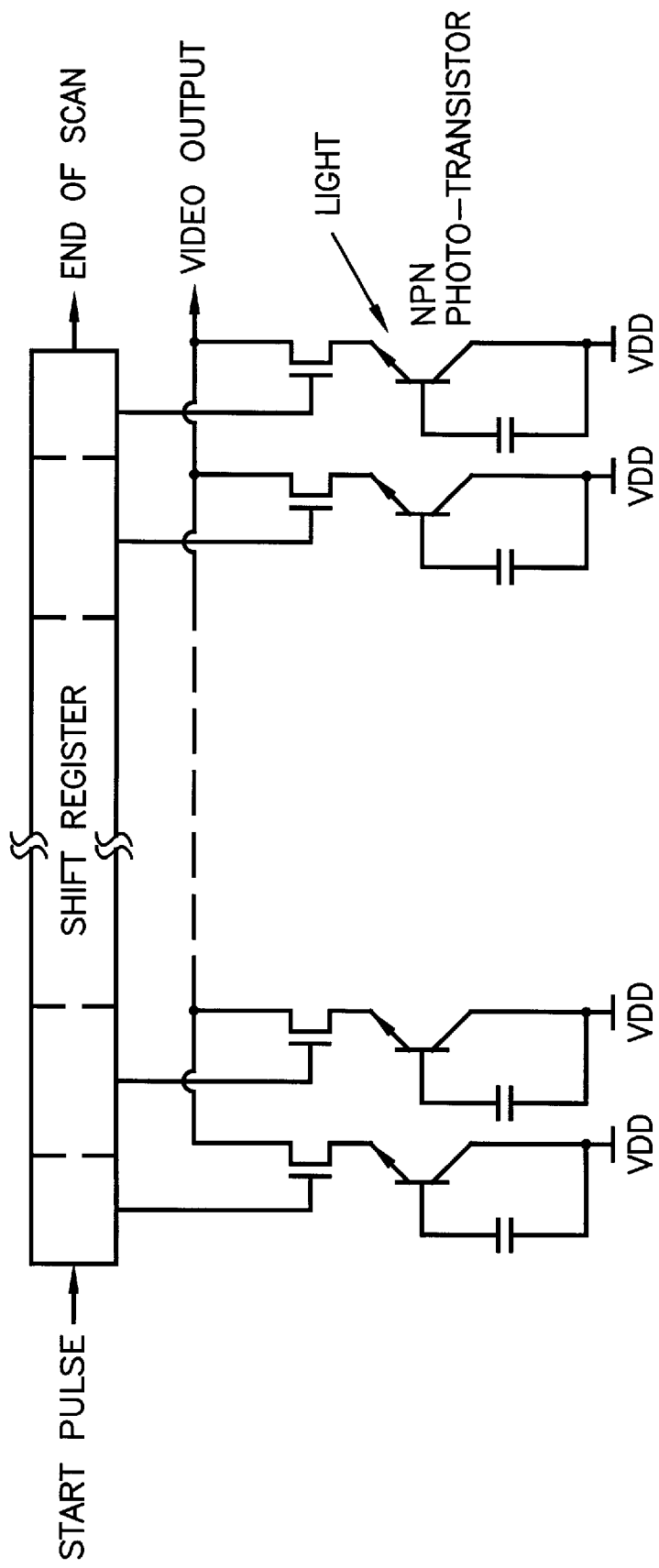
FIG. 7 shows the arrangement of npn phototransistors in a prior art array.

(2) Sampling Phase: When the Sampling phase starts, a start pulse is applied to the scanning digital shift register similar to that of the prior art CIS sensor chip shown in FIG. 6. The scanning digital shift register is not shown in FIG. 11. Instead, the outputs of the scanning register are shown in FIG. 11B as SA to SE pulses. These pulses are applied to the gates 21A to 21D of the output multiplexing switches 14A to 14D. These output pulses from the scanning shift register are further used to generate the pre-charge pulses RA to RD. As can be seen from the timing of FIG. 11B, the RA pulse can be obtained by applying the clock pulse and the SA pulse to a NAND-gate. The pre-charge pulses RA to RD are applied to the gates 22A to 22D of the pre-charge switches 13A to 13D and the isolation switches 16A to 16D.

When SA pulse is high, it closes the readout-multiplexing switch 14A and addresses the signal of detector element 11A. In the meantime, the CODD and CSEL pulses are also at the "high" state, which close the switches 41 and 44. This in effect connects the emitter of phototransistor 11A to the output video line capacitor 45. Since the base-to-emitter junction of the phototransistor 11A is forward biased, a base current will flow from the base to the emitter. Consequently, a collector current multiplied by the current gain; $h_{fe}$ or Beta, of the phototransistor will flow into the output capacitor 45. The voltage on the output video lines 31, 33, and 34 rises, and the voltage on the base of phototransistor 11A falls slightly, until the voltage difference $V_{be}$ is reduced to the base-to-emitter junction threshold voltage $V_T$, where the phototransistor turns off. Since this point is reached asymptotically slowly, usually the output voltage $V_{OUT}$ is sampled before this time. As long as the sampling is done at a constant delay after the output-multiplexing switch is closed, a valid image is obtained.

(3A) Sensor Storage Node Pre-charge Phase: During the latter part of SA pulse 51A, the RA pre-charge pulse 52A goes to "low" state and closes the P-channel pre-charge switch 13A and opens up the N-channel isolation switch 16A. This action in effect shorts the base of phototransistor 11A to its collector and injects an amount of charge equivalent to "saturation charge" to the base storage node. As mentioned previously, when the signal charge accumulated at the base storage node of the phototransistor reaches saturation, the base potential will equal the potential of the collector. The function of the isolation switch 16A is to prevent the injection of charge into the video line 31 during the charge injection period. In the meantime at the falling edge of RA pulse 52A, the CODD pulse 53 changes state and goes to "low" and the CEVEN pulse 54 goes to "high". This action turns off the ODD video-line multiplex switch 41 and grounds the ODD video line 31 through the select switch 47. This pre-charge process of the storage node will substantially improve the "apparent" reset speed of the storage node and eliminate the image-lag problem. The pre-charge process also eliminates the charge loss caused by the sub-threshold leakage current of the base-to-emitter junction, and thus eliminates the low-light-level thresholding (or waterfall-effect) problem. One thing that needs to be pointed out is that the charge injected into the base for the pre-charge process does not necessarily have to be the "saturation charge". Any charge package which is big enough to replenish the sub-threshold leakage-current loss as well as to speed up the "apparent" storage node reset process will be sufficient for the present invention. In other words, the base of the phototransistor can be reset to a potential lower than the collector potential for the pre-charge process and still retain the merit of the present invention. The reason for resetting the base to the collector in the preferred embodiment is for ease of integrated-circuit device layout.

(3B) Output Video Line Reset Phase: While the phototransistor is going through the Pre-charge process, the output circuitry is simultaneously going through the Video-Line Reset process to get ready for the reading of the next pixel. As shown in FIG. 11B, the CEVEN pulse 54, which drives the gate 24 of the EVEN video-line multiplex switch 42, changes state at the falling edge of RA pulse 52A and connects the even video line 32 to the output circuitry. Immediately following the connection of the video line 32 to the outside video circuitry, the RSET pulse 55 also turns on the video line reset switch 43 and resets video lines 32 and 33, as well as output node 34 to ground. Once the RSET pulse 55 returns to low and turns off the reset switch 43, the output circuitry is ready to read the next pixel. The reading of the next pixel begins immediately after the falling edge of RSET pulse 55 and the rising edge of the next scanning shift register output pulse 51B.

(4) Reset of Phototransistor Storage Node: Now that the charge has been injected into the storage node of phototransistor 11A, it needs to be reset so that the phototransistor can be ready for charge integration for the next line of signal. This is done during the time that the next phototransistor is being read out. As can be seen on FIG. 11A, the scanning shift register output SB not only drives the gate of the output-multiplexing switch 14B of photodetector 11B, it also drives the gate of the reset switch 15A of the photodetector 11A. During the time period that photodetector 11B is being read out and pre-charged, the emitter of phototransistor 11A is connected to ground through the reset switch 15A. The charge, which has been injected to the base storage node, is reset through the base-to-emitter forward-bias current to the ground. When the SB pulse 51B goes "low", it turns off the reset switch 15A and allows phototransistor 11A to begin integration of signal for the next line of signal. The reset of the injected charge through the same output base-to-emitter junction automatically sets the phototransistor to an initial dark level, which is at the start of a linear region of the response versus illumination curve. As a result, the photo-response linearity is substantially improved.

The process described above repeats from pixel to pixel until it reaches the last pixel on the individual sensor chip. An end-of-scan EOS signal will then be generated and fed into the next sensor chip in sequence as a start pulse. The start pulse will initiate the scanning of the next sensor chip in sequence. The integration time of a phototransistor is the time between two consecutive readings of the same phototransistor.

Alternative Embodiment

Figure 12A:
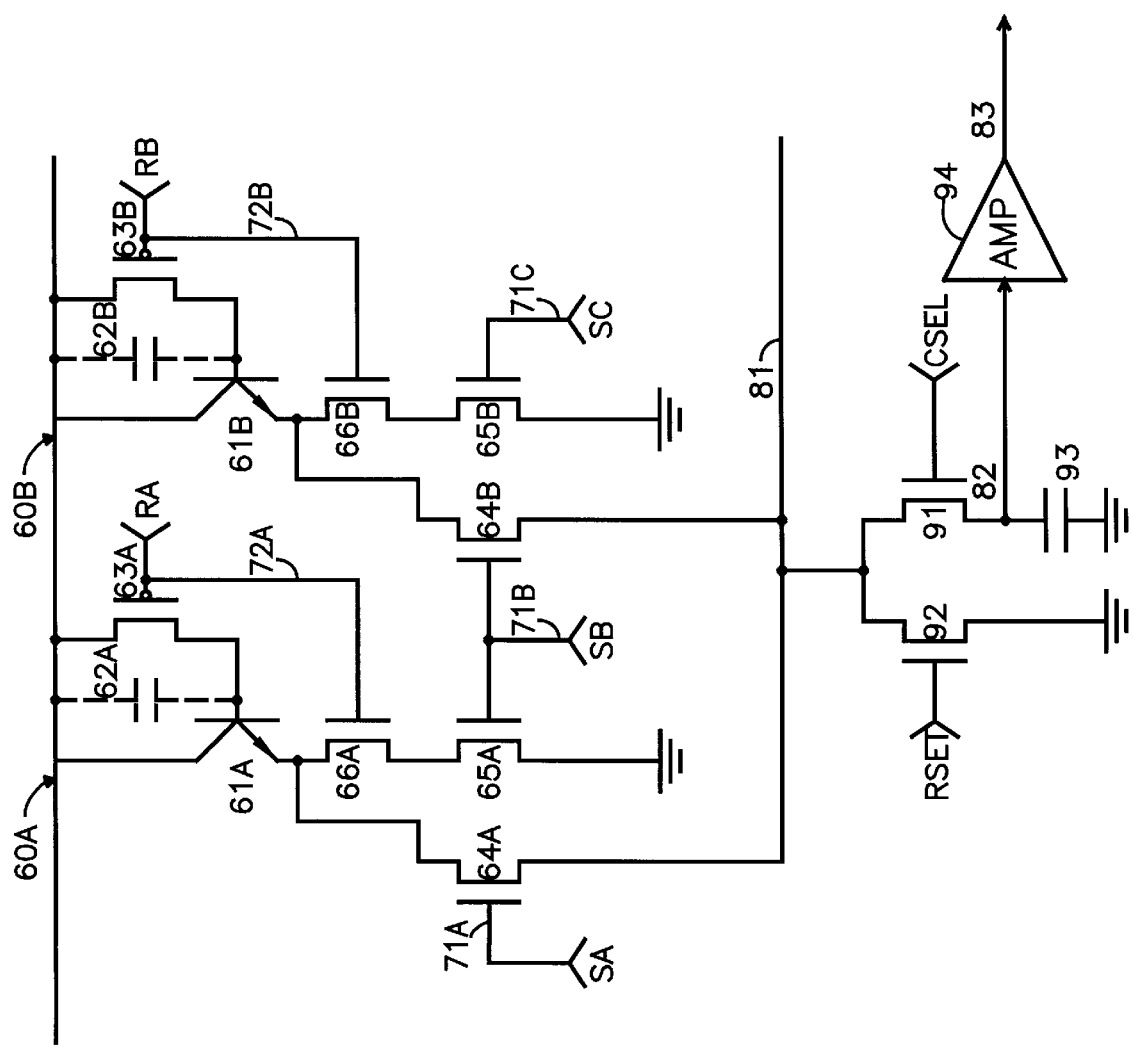
FIG. 12A shows the CIS pixel schematic of an alternative embodiment of the present invention.
Figure 12B:
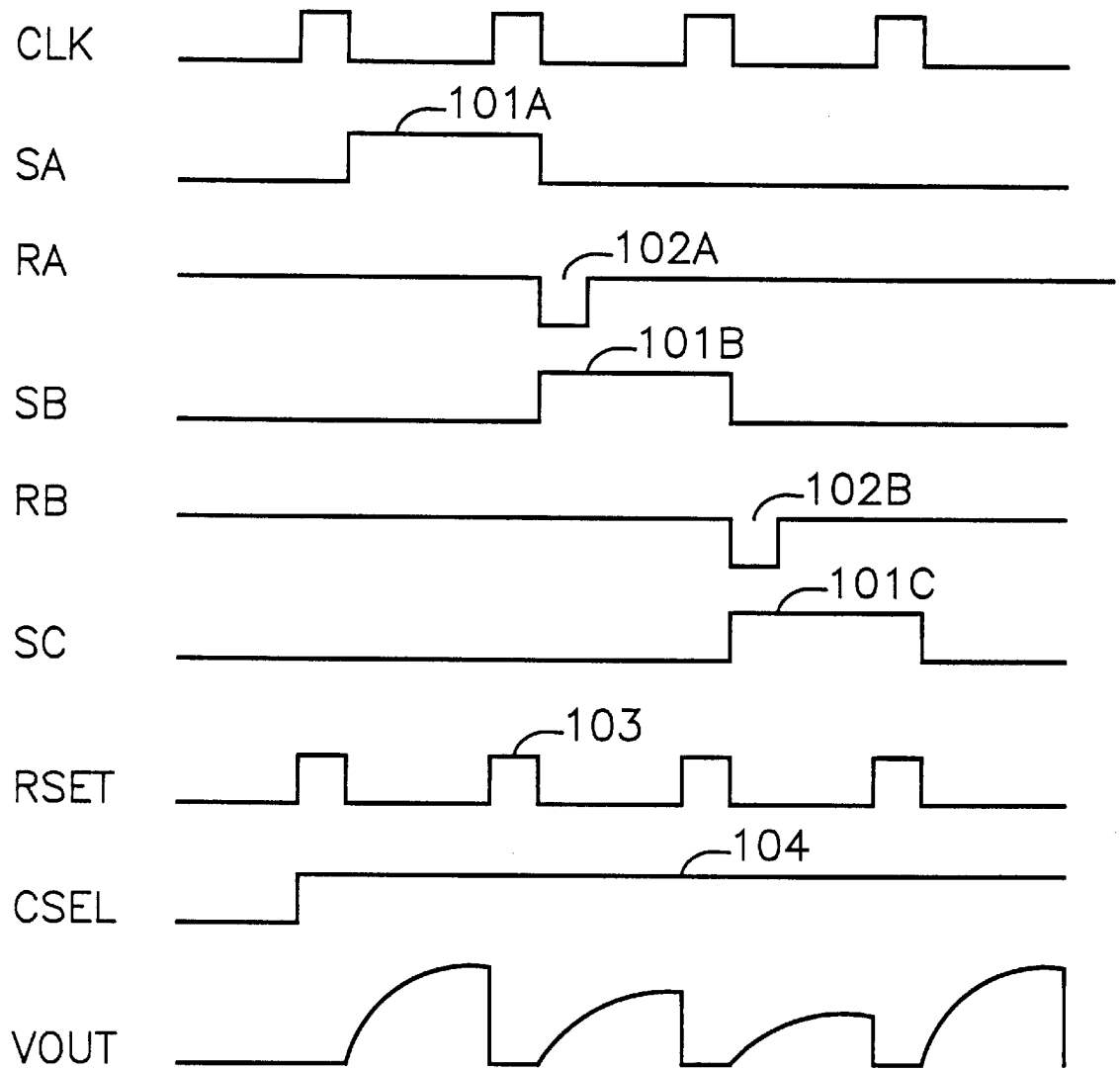
FIG. 12B shows the clock, the scanning digital shift register outputs, and other timing pulses to operate the CIS array of the device shown in FIG. 12A.

FIGS. 12A and 12B shows an alternative embodiment of the present invention, which uses a simplified single video line configuration. FIG. 12A illustrates an array of two detector elements 60A and 60B, which can be part of a longer array. FIG. 12B shows the timing diagram, which drives various nodes of the device. Similar to FIG. 8, each detector element in the array consists of a phototransistor (61A and 61B) as the sensing element. Each sensing element has a storage capacitor (62A and 62B), which is formed by the base-to-collector junction capacitance of the phototransistor. Each detector element also has a readout-multiplexing switch (64A and 64B). In addition to the above-mentioned components, each detector element in the array also consists of a pre-charge switch (63A and 63B), and an isolation switch (66A and 66B) to pre-charge the storage node (62A and 62B) after the sampling process. Each detector element further consists of a reset switch (65A and 65B) to reset the charge at the storage node through the base-to-emitter junction. The output circuit consists of the video line 81, chip-select switch 91, output capacitor 93, buffer amplifier 94, and video line reset switch 92.

Figure 8:
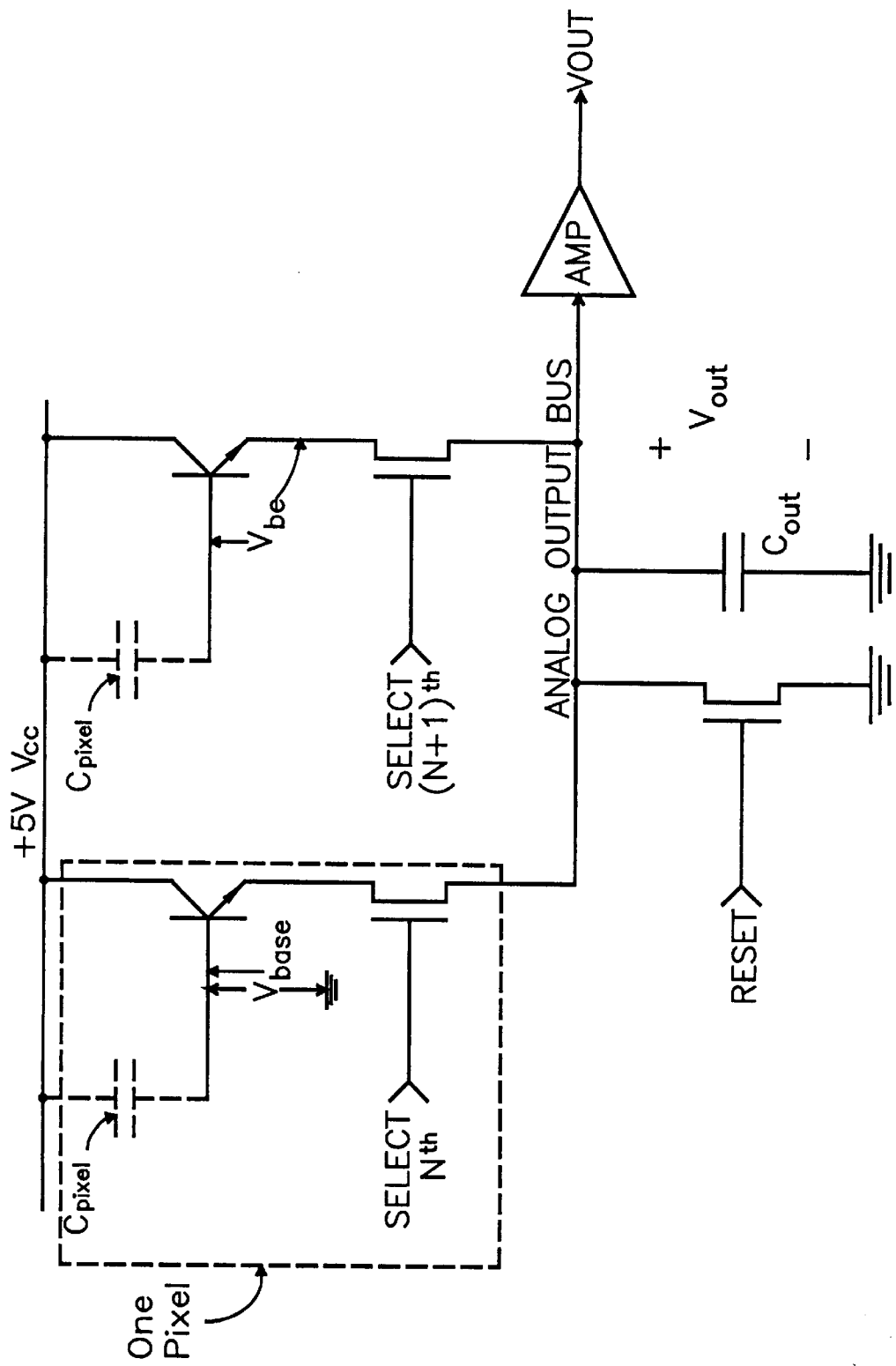
FIG. 8 shows the CIS pixels and the readout circuitry of a prior art phototransistor CIS array.
Figure 9:
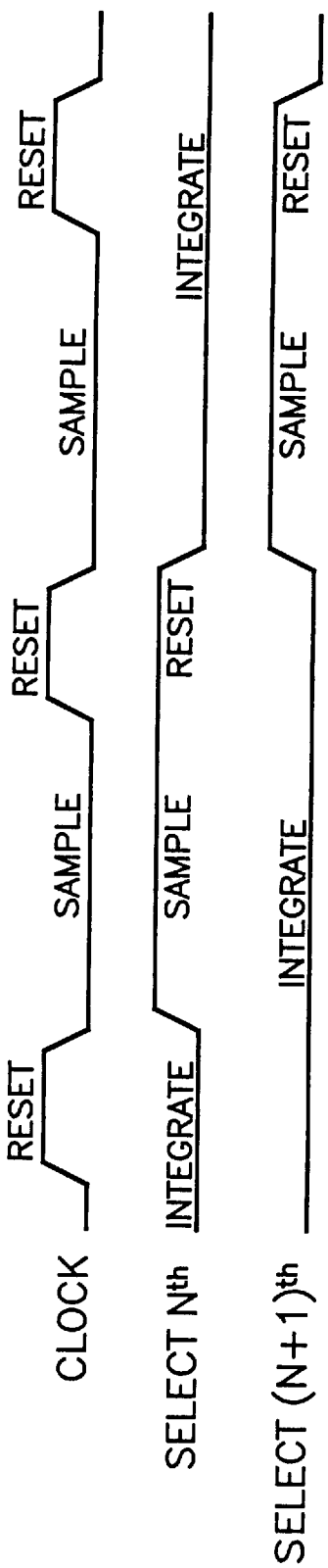
FIG. 9 shows the clock and the scanning digital shift register outputs for operating the CIS array in FIG. 8.
Figure 10:
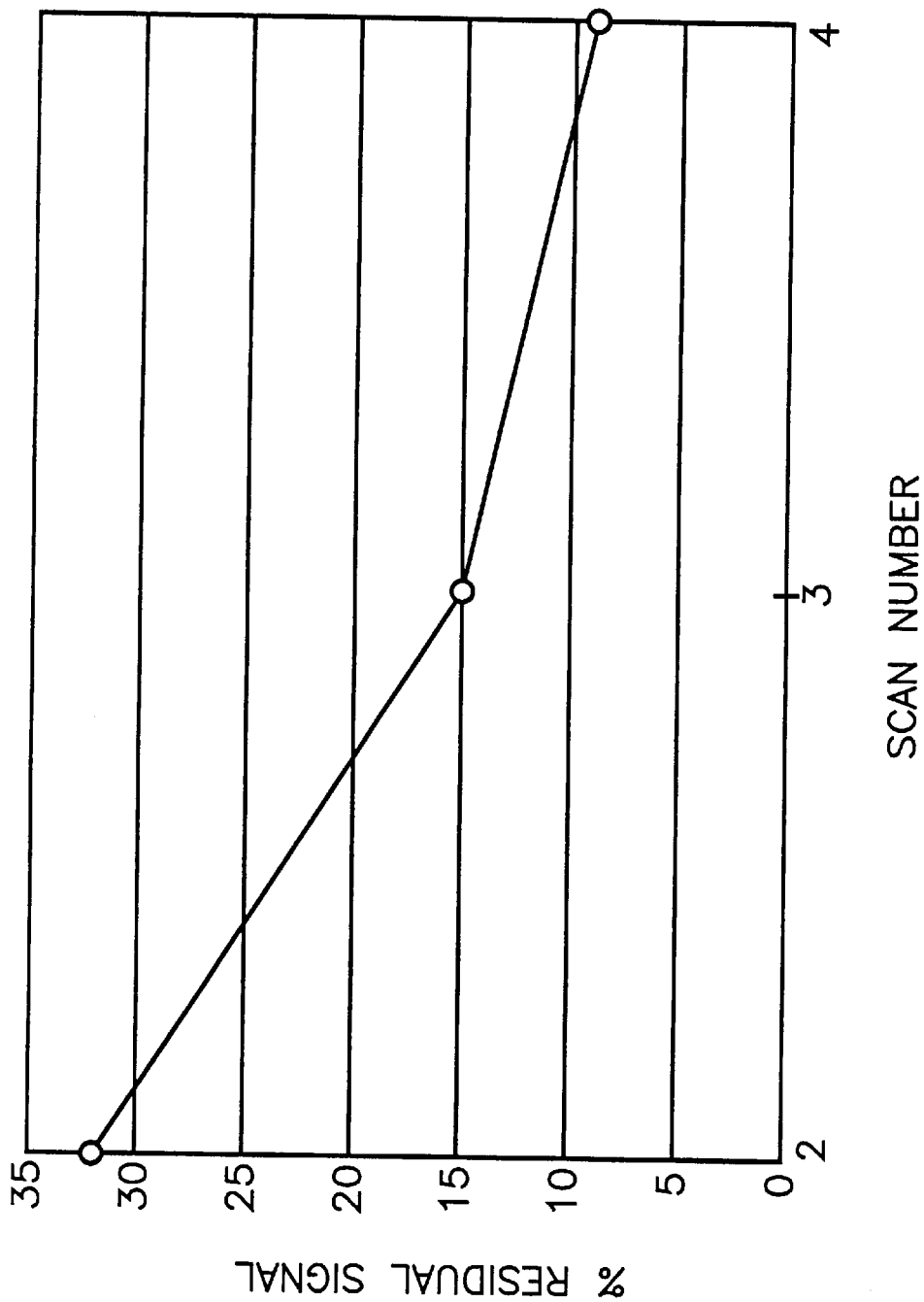
FIG. 10 shows the measured residual image as a percentage of the actual image for the second, third, and forth scans for a prior art phototransistor CIS array. The array was exposed to a pulse light for the first scan only.

The operation of the device is similar to the circuit of FIG. 8, except for the precharge and the reset operations. Similar to the device of FIG. 8, the sampling of the detector 60A occurs during the early part of the digital scanning shift register output pulse 101A. The output video line is reset near the end of the sampling pulse 101A by the reset pulse 103. During the next sampling period 101B when the signal of detector 60B is being addressed, the pre-charge pulse 102A goes "low" shorting the base and the collector of phototransistor 61A through the P-channel pre-charge switch 63A. This action in effect injects an amount of charge equivalent to the "saturation charge" to the base of the phototransistor 61A. During the injection period of pulse 102A, the N-channel isolation switch 66A is turned off to isolate the emitter of the phototransistor 61A. This action prevents the injection of a large amount of current into the ground by the phototransistor, which might cause a disturbance of the video signal. The pulse width of injection period 102A can be very narrow and is easily generated by simple logic circuitry. During the latter part of pulse 101B, the charge injected into the base of phototransistor 61A is reset through the base-to-emitter junction and the reset switch 65A. This operation makes the phototransistor detector element 60A ready for signal integration of the next line of scanning. The sampling and reset of the detector repeat for the entire array. Again, the integration time for each sensing element is the time between two consecutive readings of the same detector element.

Adaptation to Color Scanning

Figure 13:
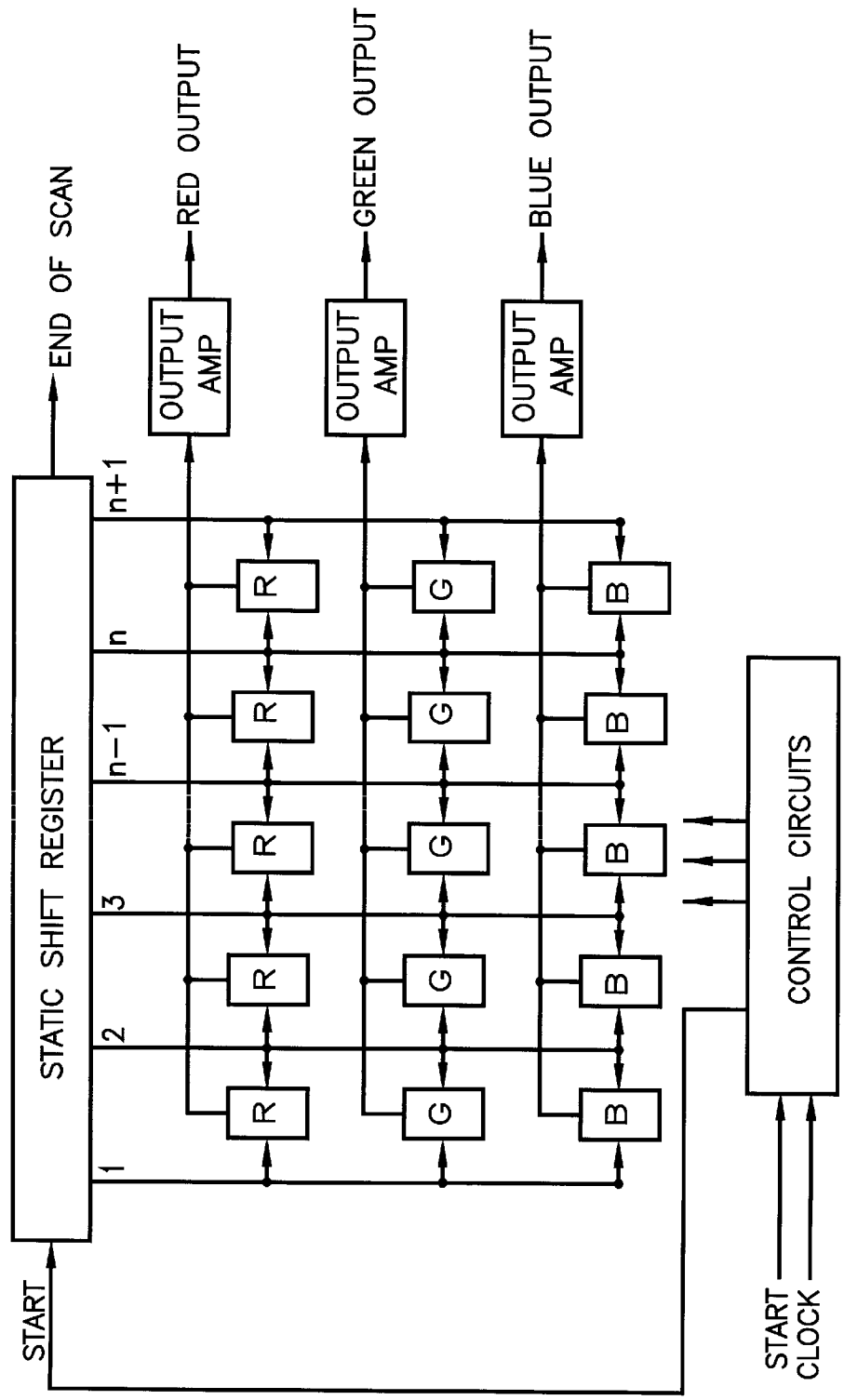
FIG. 13 is a block diagram of the implementation of a color CIS sensor chip for the present invention.

If a user desires to scan color material, the circuit of the present invention can be so adapted. In the color application, as shown in FIG. 13, three sets of phototransistor sensing elements are utilized; a first set including a red light filtering means, a second set including a green light filtering means, and a third set including a blue light filtering means. The three sets of sensing arrays can share one scanning digital shift register and all other peripheral control circuits, as shown in FIG. 13. The signals from each of these three sets of sensing elements are processed individually with a circuit similar to the output circuitry shown in FIGS. 11A and 12A.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A contact image sensor circuit comprising:
   a plurality of chips butted end-to-end, each of said chips comprising
   a plurality of sensing elements arranged in an array, each of said sensing elements comprises a phototransistor with a base storage capacitor formed by a base-to-collector capacitance of said phototransistor, a readout-multiplexing switch, a pre-charge switch, an isolation switch, and a reset switch,
   control and driving clocks to control a timing and a scan advance of said sensor circuit,
   a digital scanning shift register, and
   at least one buffer amplifier; wherein
   during an integration phase of a scan cycle of the sensor circuit, said pre-charge switch, said readout-multiplexing switch, and said reset switch are open so that said base storage capacitor is isolated, causing a current proportional to an incident light detected to flow from a collector of each sensing element in an activated array to a base of each said sensing element, and
   during a sampling phase of the scan cycle, said readout multiplexing switch is activated and closed in sequence by an output pulse of said digital scanning shift register, causing a current proportional to said detected incident light to flow into an output capacitor of an output video circuit, thereby enabling said output video circuit to read an output voltage of said phototransistor activated by said readout multiplexing switch, and
   during a pre-charge phase of the scan cycle, said pre-charge switch of said phototransistor is closed and a background charge is injected into said base storage capacitor, said isolation switch of said phototransistor being open during said pre-charge phase so that said background charge does not effect said output voltage, and
   during said pre-charge phase, said output capacitor is also reset, thereby readying said output video circuit to sample a next phototransistor in sequence, and
   during a sampling phase of said next phototransistor in sequence, said activated phototransistor is reset; such that said background charge applied during said pre-charge phase is reset through a base-to-emitter junction of said activated phototransistor, thereby eliminating any image-lag problem and replenishing any charge loss caused by any sub-threshold leakage current of said base-to-emitter junction, thereby also eliminating any low-light-level thresholding and improving a photo-response linearity of each of said phototransistors.

2. The sensor circuit as claimed in claim 1 wherein:

said sensing elements are grouped in pairs, a first sensing element of each of said pairs is connected to a first output line, a second sensing element of each of said pairs is connected to a second output line, said first and said second output lines being combined by an output multiplexing switch into a single output video line, thereby greatly improving flexibility of timing requirements for resetting of said base storage capacitor and said video line capacitor.

3. The sensor circuit as claimed in claim 1 wherein:

said reset of said background charge applied to said base storage capacitor during said pre-charge phase of said activated phototransistor is performed during said sampling phase of said next phototransistor in sequence, thereby greatly increasing time available for resetting of said base storage capacitor.

4. The sensor circuit as claimed in claim 1 wherein:

said pre-charge phase of said base storage capacitor and its subsequent reset of background charge of said first activated phototransistor through said base-to-emitter junction is performed during said sampling phase of said next phototransistor in sequence, thereby allowing uses of a single video line and simplified clock timing requirements.

5. The contact image sensor circuit of claim 1 wherein:

said sensor circuit comprises three sets of sensing elements, a first set including a red light filtering means, a second set including a green light filtering means, and a third set including a blue light filtering means, thereby enabling said sensor circuit to provide color outputs.

6. A light sensing circuit comprising:

a phototransistor with a base storage capacitor formed by a base-to-collector capacitance of said phototransistor, a readout-multiplexing switch, a pre-charge switch, and a reset switch; wherein during an integration phase of a cycle of said light sensing circuit, said pre-charge switch, said readout-multiplexing switch, and said reset switch are open so that a current proportional to a incident light detected by said light sensing circuit flows from a collector of said phototransistor to a base of said phototransistor, and during a sampling phase of the cycle, said readout-multiplexing switch is closed causing a current proportional to said detected light to flow into an output capacitor of an output circuit, thereby providing an output voltage, and during a pre-charge phase of the cycle, said readout-multiplexing switch is open and said pre-charge switch is closed, a background charge is injected into said base storage capacitor of said phototransistor, said readout-multiplexing switch being open during said pre-charge phase so that said background charge does not effect said output voltage, and following said pre-charge phase, said reset switch is closed allowing said base storage capacitor to reset through said base-to-emitter junction of said phototransistor, thereby eliminating any residual signal and any low-light-level thresholding and greatly improving operating speed of said light sensing circuit.

7. A light sensing circuit comprising:

a plurality of sensing elements arranged in an array, each of said sensing elements comprising a phototransistor with a base storage capacitor formed by a base-to-collector capacitance of said phototransistor, a readout-multiplexing switch, a pre-charge switch, and a reset switch; wherein during an integration phase of a cycle of said element, said readout-multiplexing switch, said pre-charge switch, and said reset switch of said sensing element are open so that a current proportional to an incident light detected by said circuit flows from a collector of said phototransistor to a base of said phototransistor, and during a sampling phase of the cycle, said readout-multiplexing switch of said sensing element is closed causing a current proportional to said detected light to flow into an output capacitor of an output circuit, thereby providing an output voltage of said sensing element, and during a pre-charge phase of the cycle, said readout-multiplexing switch of said sensing element is open and said pre-charge switch of said sensing element is closed, and a background charge is injected into said base storage capacitor of said phototransistor, said readout-multiplexing switch being open during said pre-charge phase so that said background charge does not effect said output voltage, and during said pre-charge phase, said output capacitor is reset, and following said pre-charge phase, said phototransistor is reset; such that said background charge applied during said pre-charge phase is reset through a base-to-emitter junction of said phototransistor, thereby eliminating any residual signal and any low-light-level thresholding, and increasing operating speed of said light sensing circuit; and said sensing elements are grouped in pairs, a first sensing element of each of said pairs is connected to a first output line, a second sensing element of each of said pairs is connected to a second output line, said first and said second output lines being combined by an output multiplexing switch into a single output video line, thereby greatly increasing time available for reset of said base storage capacitors.

8. The light sensing circuit of claim 7 wherein:

said light sensing circuit comprises three sets of sensing elements, a first set including a red light filtering means, a second set including a green light filtering means, and a third set including a blue light filtering means, thereby enabling said light sensing circuit to provide color outputs.

* * * * *